United States Patent
Sugimoto et al.

(10) Patent No.: US 11,949,812 B2
(45) Date of Patent: Apr. 2, 2024

(54) ENUM SERVER AND CONGESTION CONTROL METHOD

(71) Applicant: Nippon Telegraph and Telephone Corporation, Tokyo (JP)

(72) Inventors: Shun Sugimoto, Musashino (JP); Hiroshi Shimizu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 286 days.

(21) Appl. No.: 17/428,212

(22) PCT Filed: Jan. 24, 2020

(86) PCT No.: PCT/JP2020/002514
§ 371 (c)(1),
(2) Date: Aug. 3, 2021

(87) PCT Pub. No.: WO2020/162225
PCT Pub. Date: Aug. 13, 2020

(65) Prior Publication Data
US 2022/0124194 A1 Apr. 21, 2022

(30) Foreign Application Priority Data
Feb. 6, 2019 (JP) ................... 2019-019321

(51) Int. Cl.
*H04M 3/36* (2006.01)
*H04M 7/12* (2006.01)

(52) U.S. Cl.
CPC .......... *H04M 3/367* (2013.01); *H04M 7/121* (2013.01)

(58) Field of Classification Search
None
See application file for complete search history.

(56) References Cited

U.S. PATENT DOCUMENTS

| 7,130,397 B2 * | 10/2006 | Ferguson | H04Q 3/0091 |
| | | | 379/221.03 |
| 2008/0137832 A1 * | 6/2008 | Heinze | H04M 7/128 |
| | | | 379/220.01 |

(Continued)

FOREIGN PATENT DOCUMENTS

| JP | 2003037873 | 2/2003 |
| JP | 2004040460 | 2/2004 |

(Continued)

*Primary Examiner* — Quoc D Tran
(74) *Attorney, Agent, or Firm* — Fish & Richardson P.C.

(57) ABSTRACT

The present invention suppresses the number of connections from another network, and reduces the load on call processing apparatuses in a local network. An ENUM server 30 includes: a congestion detection unit 322 that collects traffic information regarding calls that include call destination numbers from call processing apparatuses in the local network, calculates a call amount per unit time for each call destination number, and stores the call amounts per unit time as calculated call amount information 331, and also extracts a call destination number included in an ENUM query received from the other network, references the calculated call amount information 331, and determines that calls to the call destination number are in a congested state if the call amount regarding the call destination number exceeds a predetermined threshold value; a limit processing unit 323 that, if it was determined that the call destination number included in the ENUM query is in the congested state, determine whether or not the ENUM query is to be a limit target based on predetermined limit processing; and a signal response unit 325 that, if it was determined that the ENUM query is a limit target, generates an ENUM answer that indicates connection unavailability, and transmits the ENUM answer to the other network.

3 Claims, 8 Drawing Sheets

(56) References Cited

U.S. PATENT DOCUMENTS

| | | | |
|---|---|---|---|
| 2008/0212482 A1* | 9/2008 | Nakayma | H04L 47/12 370/237 |
| 2011/0271005 A1* | 11/2011 | Bharrat | H04L 65/1063 709/232 |
| 2015/0180909 A1* | 6/2015 | Nakamatsu | H04L 67/101 370/230 |
| 2016/0072713 A1* | 3/2016 | Mhatre | H04L 67/1004 709/235 |
| 2017/0064086 A1* | 3/2017 | Mandalia | H04M 3/367 |
| 2017/0094062 A1* | 3/2017 | Nishiyama | H04M 3/42365 |
| 2020/0374261 A1* | 11/2020 | Hanazawa | H04L 61/457 |

FOREIGN PATENT DOCUMENTS

| | | | |
|---|---|---|---|
| JP | 2018026630 | | 2/2018 |
| JP | 2018133759 | | 8/2018 |
| JP | 2018133759 A | * | 8/2018 |

* cited by examiner

331 CALCULATED CALL AMOUNT INFORMATION

| CALL DESTINATION NUMBER | CALL AMOUNT PER UNIT TIME |
|---|---|
| 81312345555 | 100 |
| 81312346666 | 200 |
| 81312347777 | 1000 |
| ... | ... |

330 CONNECTION DESTINATION INFORMATION DB

| CALL DESTINATION INFORMATION | CONNECTION DESTINATION INFORMATION |
|---|---|
| 5.5.5.5.4.3.2.1.3.1.8.e164enum.net | sip:+81312345555@carrier_a.ne.jp |
| 6.6.6.6.4.3.2.1.3.1.8.e164enum.net | sip:+81312346666@carrier_a.ne.jp |
| 7.7.7.7.4.3.2.1.3.1.8.e164enum.net | sip:+81312347777@carrier_a.ne.jp |
| 8.8.8.8.4.3.2.1.3.1.8.e164enum.net | sip:+81312348888@carrier_b.ne.jp |
| 9.9.9.9.4.3.2.1.3.1.8.e164enum.net | sip:+81312349999@carrier_c.ne.jp |
| ... | ... |

ENUM SERVER AND CONGESTION CONTROL METHOD

CROSS-REFERENCE TO RELATED APPLICATIONS

This application is a National Stage application under 35 U.S.C. § 371 of International Application No. PCT/JP2020/002514, having an International Filing Date of Jan. 24, 2020, which claims priority to Japanese Application Serial No. 2019-019321, filed on Feb. 6, 2019. The disclosure of the prior application is considered part of the disclosure of this application, and is incorporated in its entirety into this application.

TECHNICAL FIELD

The present invention relates to an ENUM server and a congestion control method for use in the field of ENUM (E.164 Number Mapping) technology for name resolution for resolving the telephone numbers of IP (Internet Protocol) telephones into URIs (Uniform Resource Identifiers).

BACKGROUND ART

Conventionally, the ENUM system has been proposed as a system in which, in an IP network, telephone numbers are associated with URIs (Uniform Resource Identifiers) by an apparatus (e.g., a call control server) in a communication provider network. In this ENUM system, a call control server (SIP (Session Initiation Protocol) server) provided in the communication provider network queries an ENUM server for connection destination information (e.g., an IP address or a domain name) for the telephone number of a connection destination terminal (e.g., an IP telephone), and performs routing based on the connection destination information. Note that in the ENUM system, the call control server generates an ENUM query (ENUM signal) that is compliant with the ENUM protocol in order to make a query for connection destination information (e.g., an IP address or a domain name).

Specifically, as shown in FIG. 6, in an ENUM system 900, upon receiving a connection request (SIP signal) from a terminal 1 (step S61), an SIP server 2 in the local network (the sender communication provider network, i.e., the sender provider network) generates an ENUM query (ENUM signal) and transmits a request for connection destination information corresponding to the call destination information to an ENUM server 3 (step S62). If the call destination number indicated by the call destination information is a telephone number managed in the local network (sender provider network), the ENUM server 3 acquires the connection destination information that corresponds to the call destination information from its own connection destination information DB (database), generates an ENUM answer (ENUM signal), and transmits the ENUM answer to the SIP server 2 in the local network (step S63), and then makes a call connection with the call destination terminal in the local network (step S64).

On the other hand, FIG. 7 is a diagram showing the case where the call destination number indicated by the call destination information is a telephone number managed in another network (the receiver communication provider network, i.e., the receiver provider network). In this case, in the ENUM system 900, upon receiving a connection request (SIP signal) from a terminal 1 (step S71), the SIP server 2 in the local network (sender provider network) generates an ENUM query (ENUM signal) and transmits a request for connection destination information corresponding to the call destination information to the ENUM server 3 (step S72). If the call destination number indicated by the call destination information is a telephone number managed in another network (the receiver communication provider network, i.e., the receiver provider network), the ENUM server 3 in the sender provider network transmits the ENUM query to the ENUM server 3 in the receiver provider network that manages that telephone number (step S73). The ENUM server 3 in the other network acquires the connection destination information that corresponds to the call destination information from its own connection destination information DB (database) and generates an ENUM answer (ENUM signal), and transmits the ENUM answer to the ENUM server 3 in the sender provider network (step S74). The ENUM server 3 in the sender provider network transmits the acquired ENUM answer to the SIP server 2 in the local network (step 375). Because the connection destination indicated by the acquired connection destination information is in another network rather than the local network, the SIP server 2 in the sender provider network transmits a connection request to the SIP server 2 in the other network (receiver provider network) in order to make a call connection with the call destination terminal 1 in the receiver provider network (step S76).

The ENUM server accepts access from multiple call control servers and the like provided in the communication provider network, and, because each call control server stores information on a large number of terminals (e.g., IP telephones), the ENUM server accepts access from an enormous number of terminals overall.

If a large number of calls are made to a certain number or a certain region when event tickets or the like are sold or a disaster occurs, congestion occurs in the ENUM queries. The ENUM server may require more time to respond to queries from call control servers, or in the worst case may fail to respond, thus leading to more connection delays or connection failures between terminals. Note that congestion that occurs due to the sale of event tickets or the like is also called event-related congestion.

If many calls are made to a specific call destination number due to event-related congestion or the like, the amount of traffic to that number temporarily increases, which has an effect of making it difficult to connect to other numbers, for example. For this reason, congestion control is performed for that specific number.

FIG. 8 is a diagram for describing conventional congestion control in the case where the call destination number indicated by call destination information is a telephone number managed in another network (receiver provider network).

In FIG. 8, similarly to the example shown in FIG. 7, the ENUM server 3 in the sender provider network receives an ENUM query from the SIP server 2 in the local network, and if the call destination number indicated by the call destination information is a telephone number managed in another network (receiver provider network), the ENUM server 3 in the sender provider network makes a request to the ENUM server 3 in the receiver provider network that manages the call destination telephone number in order to acquire connection destination information. The ENUM server 3 in the sender provider network then transmits an ENUM answer that includes the connection destination information to the SIP server 2 in the local network. Because the connection destination indicated by the acquired connection destination information is in another network rather than the local network, the SIP server 2 in the sender provider network transmits a connection request (SIP signal) to the SIP server 2 in the receiver provider network via an NNI-SBC (Network-Network Interface—Session Border Controller) 4 that has a gateway function. Upon receiving the SIP signal from the sender provider network, the NNI-SBC 4 in the receiver provider network makes a call connection by transmitting the SIP signal to call processing apparatuses such as a CSCF (Call Session Control Function) 5 and an AS (Application Server) 6. Note that the CSCF 5 and the AS 6 in the receiver provider network are SIP servers that use the SIP communication protocol similarly to the SIP server 2 in the sender provider network. When event-related congestion or the like occurs in the receiver provider network, a large number of SIP signals are sent from another network (sender provider network) to a specific number managed in the local network (receiver provider network). In this case, a traffic monitoring apparatus 7, which monitors the overall traffic in the receiver provided network, detects the congestion and sends limit instructions to call processing apparatuses such as apparatuses for relaying calls and apparatuses for performing session control.

In conventional technology, it is presumed that congestion control is performed on SIP signals, and apparatuses such as the NNI-SBC 4 that are connected to the other network (sender provider network) and receive a large number of SIP signals are subjected to an increased processing load.

On the other hand, techniques for performing congestion control with use of the ENUM server include a function by which the ENUM itself avoids congestion, and a function by which calls that meet a certain condition are allocated to a dedicated ENUM server. In the invention described in PTL 1, if many inquiries are made for a specific number, the inquiries to that number are allocated to a specific ENUM server in order to mitigate the influence on other calls.

CITATION LIST

Patent Literature

[PTL 1] JP 2018-133759A

SUMMARY OF THE INVENTION

Technical Problem

However, although it is possible to reduce the load on the ENUM server when controlling congestion with use of the ENUM server as described above, it has not been possible to avoid congestion in the network overall. Also, with the conventional technique for overall network congestion control shown in FIG. 8, congestion control is performed by the traffic monitoring apparatus 7 after the amount of traffic increases due to an in-network apparatus (call processing apparatus) such as the NNI-SBC 4 receiving a large number of SIP signals from another network (sender provider network), and therefore it has not been possible to control the number of connections to the local network (receiver provider network). Accordingly, it has not been possible to suppress an increase in the load on apparatuses that make connections with other networks in particular.

The present invention was achieved in light of the foregoing circumstances, and an object of the present invention is to provide an ENUM server and a congestion control method that can suppress the number of connections from another network and reduce the load on call processing apparatuses in the local network.

Means for Solving the Problem

In order to solve the foregoing problems, the invention recited in claim 1 is an ENUM server for receiving an ENUM query from another network that includes a sender terminal and transmitting, to the other network, connection destination information that corresponds to a call destination number of a receiver terminal that is indicated in the ENUM query and managed in a local network, the ENUM server including: a signal reception unit configured to receive an ENUM query from the other network; a congestion detection unit configured to collect traffic information regarding calls that include call destination numbers from call processing apparatuses in the local network, calculate a call amount per unit time for each call destination number, and store the call amounts per unit time as calculated call amount information in a storage unit, and also configured to extract a call destination number included in the received ENUM query, reference the calculated call amount information, and determine that calls to the extracted call destination number are in a congested state if the call amount regarding the extracted call destination number exceeds a predetermined threshold value; a limit processing unit configured to, if it was determined that the call destination number included in the received ENUM query is in the congested state, determine whether or not the ENUM query is to be a limit target based on predetermined limit processing; and a signal response unit configured to, if it was determined that the ENUM query is the limit target, generate an ENUM answer that indicates connection unavailability, and transmit the ENUM answer to the other network.

Also, the invention recited in claim 3 is a congestion control method performed in an ENUM server for receiving an ENUM query from another network that includes a sender terminal and transmitting, to the other network, connection destination information that corresponds to a call destination number of a receiver terminal that is indicated in the ENUM query and managed in a local network, the congestion control method causing the ENUM server to execute: a step of collecting traffic information regarding calls that include call destination numbers from call processing apparatuses in the local network, calculating a call amount per unit time for each call destination number, and storing the call amounts per unit time as calculated call amount information in a storage means; a step of receiving an ENUM query from the other network; a step of extracting a call destination number included in the received ENUM query, referencing the calculated call amount information, and determining that calls to the extracted call destination number are in a congested state if the call amount regarding the extracted call destination number exceeds a predetermined threshold value; a step of, if it was determined that the call destination number included in the received ENUM query is in the congested state, determining whether or not the ENUM query is to be a limit target based on predetermined limit processing; and a step of, if it was determined that the ENUM query is the limit target, generating an ENUM answer that indicates connection unavailability, and transmitting the ENUM answer to the other network.

According to these configurations, the ENUM server can execute limit processing on an ENUM query that includes a call destination number that is in a congested state, and transmit an ENUM answer that indicates connection unavailability to the other network. Accordingly, it is possible to suppress the number of connections from the other network (sender) to the local network (receiver) and reduce the load on call processing apparatuses in the local network.

Effects of the Invention

According to the present invention, it is possible to provide an ENUM server and a congestion control method that can suppress the number of connections from another network and reduce the load on call processing apparatuses in the local network.

DESCRIPTION OF EMBODIMENTS

The following describes an ENUM server 30 and the like in a mode for carrying out the present invention (hereinafter, called the present embodiment).

First, a congestion control system 100 that includes the ENUM server 30 of the present embodiment will be described.

Figure 1:
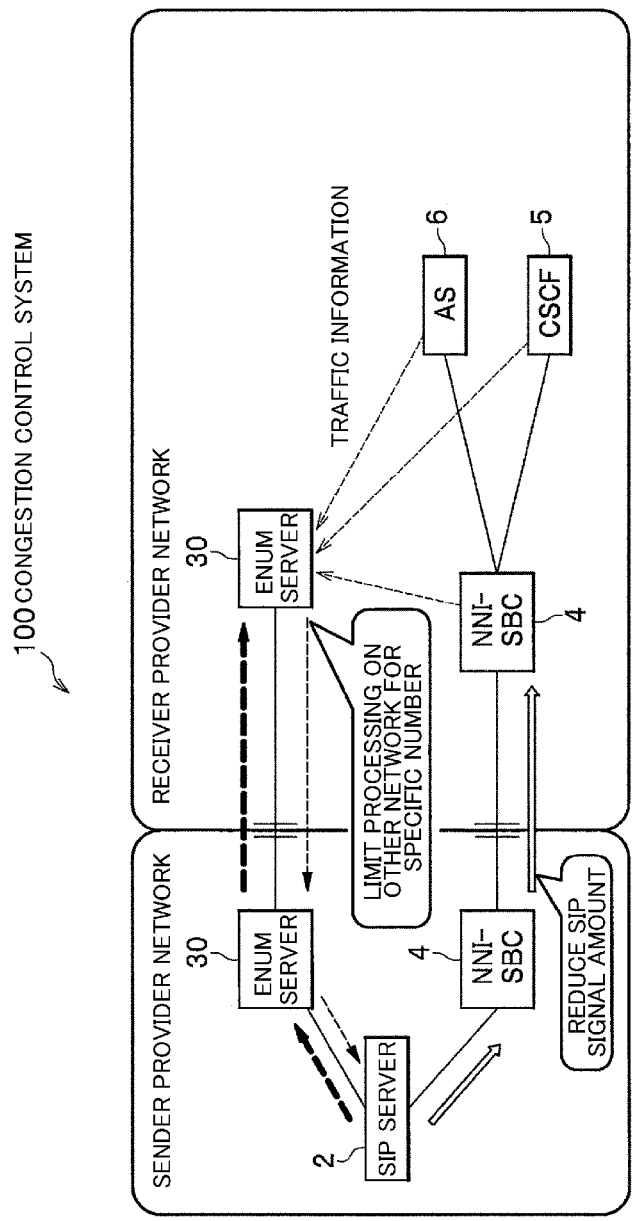
FIG. 1 is a diagram for describing an overall configuration of a congestion control system that includes an ENUM server according to an embodiment, and an overview of processing performed therein.

FIG. 1 is a diagram for describing the overall configuration of the congestion control system 100 that includes the ENUM server 30 according to the present embodiment, and an overview of processing performed therein.

Figure 8:
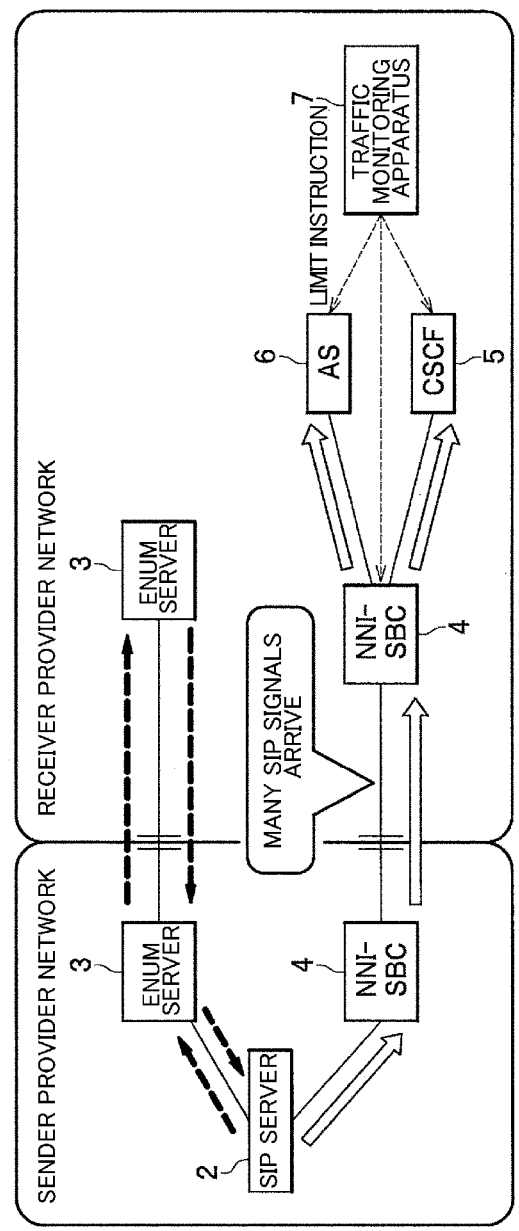
FIG. 8 is a diagram for describing conventional congestion control performed through monitoring overall network traffic.

The congestion control system 100 shown in FIG. 1 is different from the system shown in FIG. 8 in that, in the congestion control system 100 of the present embodiment, the receiver provider network is not provided with the traffic monitoring apparatus 7 that monitors call processing apparatuses and performs limit control as in the system in FIG. 8. Instead, the ENUM server 30 monitors the traffic of call processing apparatuses in the network. Note that the call processing apparatuses are in-network apparatuses such as an NNI-SBC 4, a CSCF 5, and an AS 6. The CSCF 5 includes a call session control function and is an apparatus in the receiver provider network that realizes processing similar to that of the previously-described SIP server 2 in the sender provider network.

The ENUM server 30 collects traffic information regarding calls to call destination numbers (a specific number), from call processing apparatuses in the local network. If the ENUM server 30 detects congestion with respect to the specific number based on the collected information, upon receiving an ENUM query for that call destination number (specific number) from an ENUM server 30 in another network (sender provider network), the ENUM server 30 in the local network transmits an ENUM answer that indicates connection unavailability. The SIP server 2 in the other network (sender provider network) receives the ENUM answer that indicates connection unavailability, and therefore cannot obtain connection destination information for the receiver provider network and cannot transmit a connection request (SIP signal) to the other network.

In this way, the ENUM server 30 monitors overall network traffic and performs limiting if congestion is detected with respect to a specific number, thus making it possible to suppress the number of SIP signal connections from the other network (sender provider network) to the local network (receiver provider network). Accordingly, in comparison with conventional technology, it is possible to reduce the number of SIP signals due to call limiting, and reduce the load on call processing apparatuses in the local network (receiver provider network).

ENUM Server

The following describes the ENUM server 30 of the present embodiment.

Figure 2:
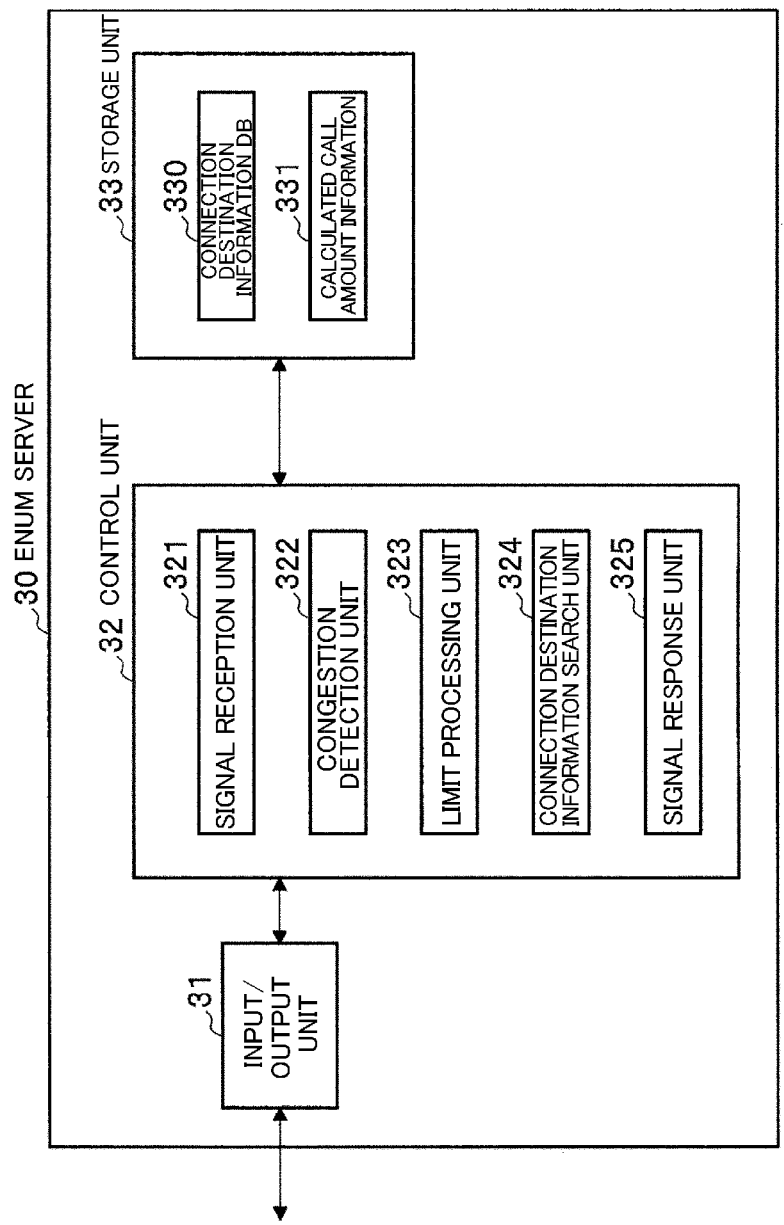
FIG. 2 is a function block diagram showing an example of the configuration of the ENUM server according to the embodiment.

FIG. 2 is a function block diagram showing an example of the configuration of the ENUM server 30 according to the present embodiment.

The ENUM server 30 receives a query made using an ENUM query from an SIP server 2 in the local network or an ENUM server 30 in another network, references a connection destination information DB 330 and extracts connection destination information that corresponds to call destination information, and transmits an ENUM answer that includes the connection destination information. Upon receiving an ENUM query from the other network (sender provider network), if the ENUM server 30 determines that congestion is occurring in the local network (receiver provider network) with respect to calls to the call destination number (specific number) indicated in the ENUM query, the ENUM server 30 transmits an ENUM answer that indicates connection unavailability.

The ENUM server 30 includes an input/output unit 31, a control unit 32, and a storage unit 33.

The input/output unit 31 inputs and outputs information from and to other apparatuses and the like. For example, the input/output unit 31 transmits and receives information to and from the SIP server 2 in the local network, the ENUM server 30 in the other network, and the like. The input/output unit 31 is constituted by a communication interface for transmitting and receiving information via a communication line, and an input/output interface for inputting and outputting information from and to an input apparatus such as a keyboard (not shown) and an output apparatus such as a monitor.

The storage unit 33 (storage means) is constituted by a hard disk, a flash memory, a RAM, or the like.

The storage unit 33 stores later-described calculated call amount information 331 (see FIG. 3) and the connection destination information DB 330 (see FIG. 4), and also temporarily stores programs for executing the functions of the control unit 32 and information necessary for processing performed by the control unit 32.

Note that the storage unit 33 stores information regarding call connection limiting. The information regarding call connection limiting includes information on a threshold value for staring limiting (described in detail later), the number of queries allowed (per second) when limiting is executed (e.g., 50 queries/second), and a limiting ratio (e.g. "1/2"), for example.

The control unit 32 performs overall control of the processing executed by the ENUM server 30, and includes a signal reception unit 321, a congestion detection unit 322, a limit processing unit 323, a connection destination information search unit 324, and a signal response unit 325. Note that the control unit 32 is realized by a program stored in the storage unit 33 of the ENUM server 30 being deployed to a RAM and executed by a CPU, for example.

The signal reception unit 321 receives ENUM queries from the ENUM server 30 in the other network and the SIP server 2 (CSCF 5 or the like) in the local network. The signal reception unit 321 then outputs, to the congestion detection unit 322, the ENUM query received from the ENUM server 30 in the other network. The signal reception unit 321 also outputs the ENUM query received from the SIP server 2 in the local network to the connection destination information search unit 324.

The congestion detection unit 322 collects traffic information regarding calls to call destination numbers (a specific number) from call processing apparatus in the network (NNI-SBC 4, CSCF 5, AS 6, and the like), calculates the call amount per unit time, and stores the calculated results as calculated call amount information 331 in the storage unit 33.

Figure 3:
FIG. 3 shows an example of the data configuration of calculated call amount information according to the embodiment.

FIG. 3 shows an example of the data configuration of the calculated call amount information 331 according to the present embodiment.

In the calculated call amount information 331, a calculated call amount per unit time is stored for each call destination number (specific number).

For example, the call amount of "100 (per second)" is stored for the call destination number (E.164 number) "81312345555".

If the number of calls to a call destination number exceeds a predetermined threshold value (e.g., 500 per second), the congestion detection unit 322 determines that the call destination number is in a congested state. In FIG. 3, the call destination number "81312347777" has a traffic of "1000 (per second)", which exceeds the predetermined threshold value, and therefore the call destination number is determined to be in the congested state.

Upon receiving an ENUM query from the signal reception unit 321, the congestion detection unit 322 extracts the call destination number (specific number) included in the ENUM query, references the calculated call amount information 331, and determines whether or not that call destination number is in the congested state. Upon determining that the call destination number is in the congested state, the congestion detection unit 322 outputs the ENUM query that includes that call destination number to the limit processing unit 323. On the other hand, upon determining that the call destination number is not in the congested state, the congestion detection unit 322 outputs the ENUM query to the connection destination information search unit 324.

The limit processing unit 323 executes predetermined limit processing on an ENUM query that includes a call destination number that was determined to be in the congested state. For example, the limit processing unit 323 determines that an ENUM query is a limit target if the ENUM query exceeds the number of queries allowed per unit time (e.g., 50 queries/second), and determines that ENUM queries that include the call destination number are limit targets in accordance with the limiting ratio (e.g., "1/2").

The limit processing unit 323 outputs an ENUM query determined to be a limit target to the signal response unit 325. The limit processing unit 323 outputs an ENUM query determined to not be a limit target to the connection destination information search unit 324.

Upon receiving an ENUM query, the connection destination information search unit 324 extracts the call destination information included in the query. The connection destination information search unit 324 then references the connection destination information DB 330 (see FIG. 4) in the storage unit 33 and searches for connection destination information that corresponds to the call destination information. The connection destination information search unit 324 extracts the connection destination information that was found in the connection destination information DB 330, and outputs a processing instruction to the signal response unit 325.

Figure 4:
FIG. 4 shows an example of the data configuration of a connection destination information DB according to the embodiment.

FIG. 4 shows an example of the data configuration of the connection destination information DB 330 according to the present embodiment.

As shown in FIG. 4, connection destination information is stored in correspondence with call destination information in the connection destination information DB 330. Specifically, the call destination information includes E.164 numbers that have been converted into an ENUM protocol domain format (e.g., "5.5.5.5.4.3.2.1.8.e164enum.net") based on call destination numbers (the telephone numbers of call destination terminals 1). The connection destination information corresponding to the call destination information includes URIs that include the E.164 numbers of the call destination terminals 1 and the domain names of the connection destination communication providers (carrier_a.ne.jp), for example.

In the case of an ENUM query for which the connection destination information search unit 324 extracted connection destination information, the signal response unit 325 generates an ENUM answer that includes the extracted connection destination information and transmits the ENUM answer to the ENUM server 30 in the other network or the SIP server 2 in the local network that transmitted the ENUM query.

On the other hand, in the case of an ENUM query that the limit processing unit 323 determined to be a limit target, the signal response unit 325 generates an ENUM answer that indicates connection unavailability, and transmits the ENUM answer to the ENUM server 30 in the other network.

When generating the ENUM answer that indicates connection unavailability, the signal response unit 325 generates the ENUM answer by setting "5" (declined) as the set value in the "RCODE field" regarding an answer determined by the ENUM standard "JJ-90.31" ("Common Interconnection Interface For Carrier ENUM", Version 4.0, Aug. 29, 2018, Telecommunication Technology Committee), for example. Note that the set value "5" means that an ENUM answer will not be transmitted according to the carrier policy. However, the setting of the ENUM answer that indicates connection unavailability is not limited to the above example.

Also, it is desirable that the signal response unit 325 sets the TTL (Time To Live) of the ENUM answer to a value smaller than the recommended value defined in the ENUM standard (60 seconds). The TTL value may be "0" for example, and, due to reducing (or eliminating) the cache survival time, upon receiving an ENUM query that includes a call destination number determined to be in the congested state, the ENUM server 30 in the receiver provider network can perform limiting without waiting for the cache survival time.

In this way, according to the ENUM server 30 of the present embodiment, limit processing is executed on an ENUM query that includes a call destination number (specific number) that is in the congested state, and an ENUM answer that indicates connection unavailability is transmitted to the ENUM server 30 in the other network (sender provider network). Accordingly, it is possible to suppress the number of connections from the other network (sender provider network) to the local network (receiver provider network), and to reduce the load on a call processing apparatus in the local network (receiver provider network).

ENUM Server Processing

The following describes the flow of processing of the ENUM server 30 of the present embodiment.

Figure 5:
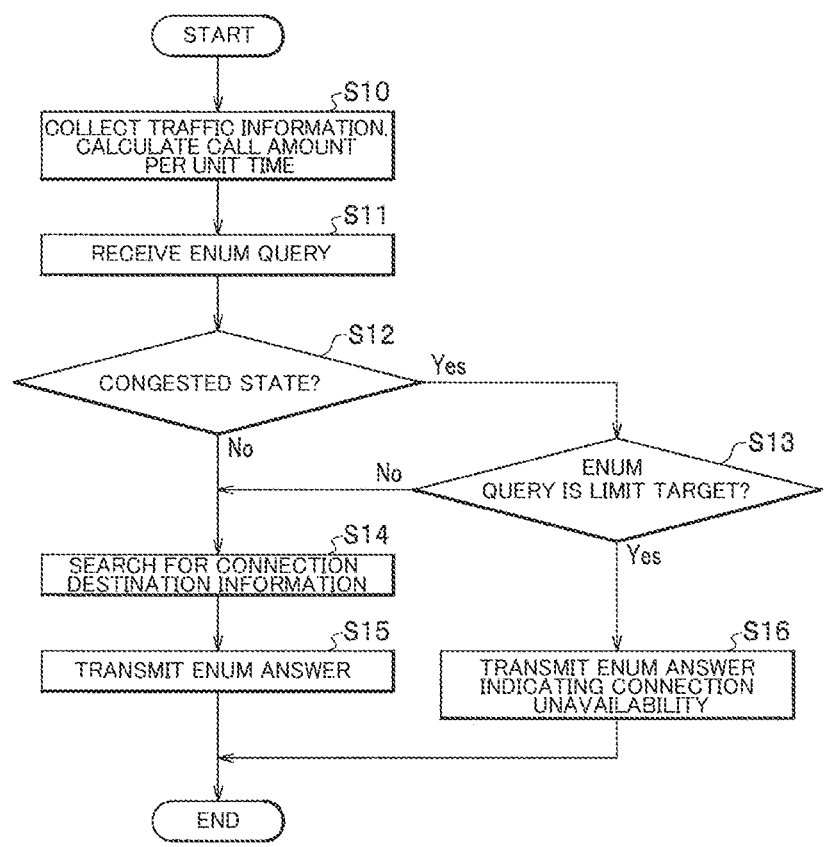
FIG. 5 is a flowchart showing a flow of processing of the ENUM server according to the present embodiment.
Figure 6:
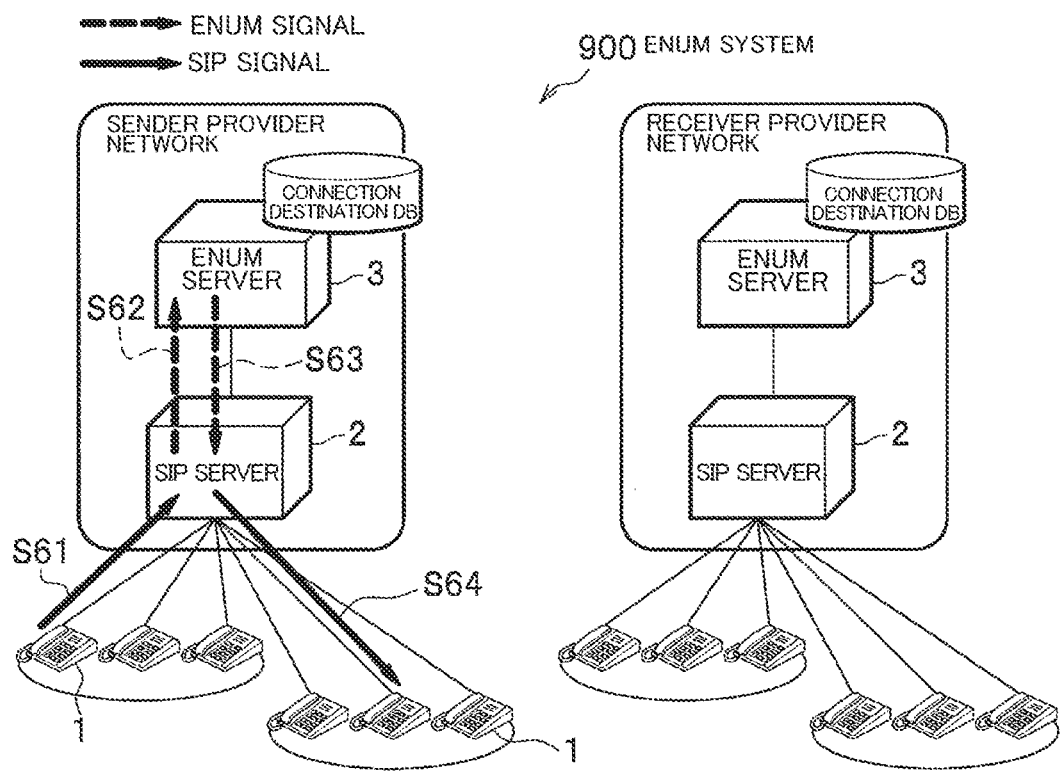
FIG. 6 is a diagram for describing a query processing flow (local network bound) in a conventional ENUM system.
Figure 7:
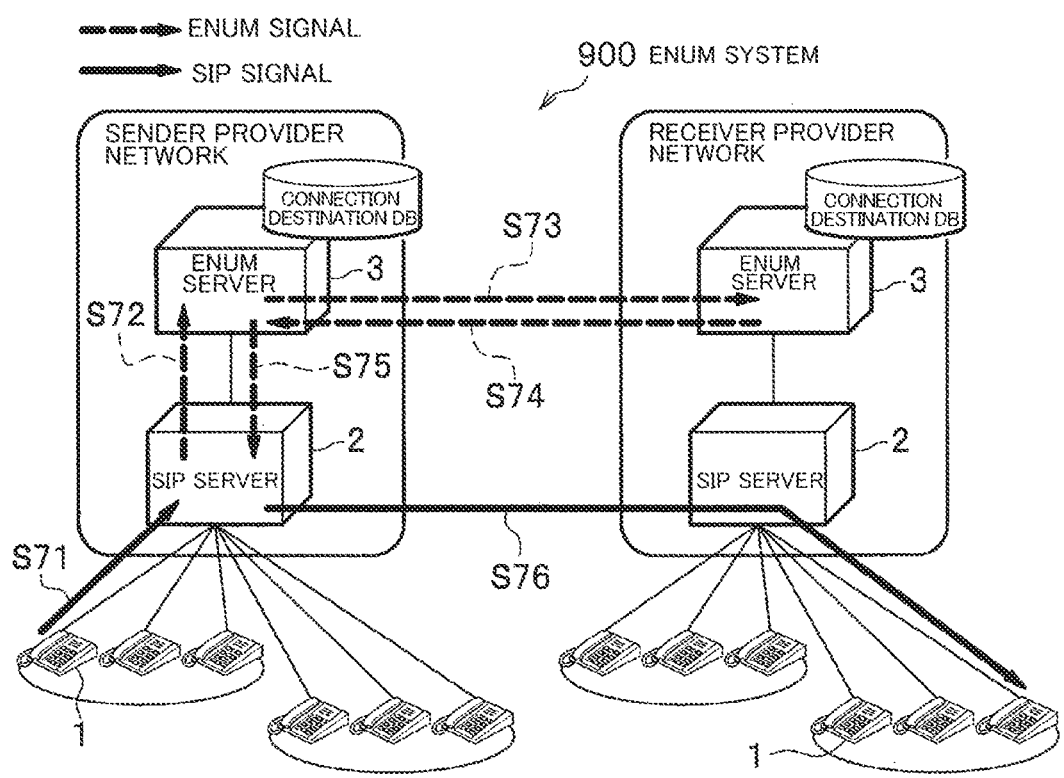
FIG. 7 is a diagram for describing a query processing flow (other network bound) in the conventional ENUM system.

FIG. 5 is a flowchart showing the flow of processing of the ENUM server 30 according to the present embodiment. Note that the following describes the case where the ENUM server 30 of the local network (receiver provider network) receives an ENUM query from the ENUM server 30 of the other network (sender provider network).

First, the congestion detection unit 322 of the ENUM server 30 collects traffic information regarding calls to call destination numbers (a specific number) from call processing apparatuses in the local network, calculates the call amount per unit time, and stores the calculated call amount information 331 in the storage unit 33 (step S10). Note that the traffic information calculation processing is performed by the congestion detection unit 322 at a predetermined time interval, and the latest current state is stored.

Next, the ENUM server 30 (signal reception unit 321) receives an ENUM query (connection request) from the ENUM server 30 in the other network (sender provider network) (step S11). The signal reception unit 321 outputs the received ENUM query to the congestion detection unit 322.

The congestion detection unit 322 extracts the call destination number (specific number) included in the received ENUM query, and determines whether calls to that call destination number are in the congested state (step S12). The congestion detection unit 322 references the calculated call amount information 331 (FIG. 3) and determines whether or not the predetermined threshold value has been exceeded in order to determine whether or not calls to the call destination number are in the congested state.

If the congestion detection unit 322 determined that calls to the call destination number are not in the congested state (step S12: No), the processing of the ENUM query moves to step S14.

On the other hand, if the congestion detection unit 322 determined that calls to the call destination number are in the congested state (step S12: Yes), the processing moves to step 313.

In step S13, the limit processing unit 323 determines whether or not predetermined limit processing is to be executed on the ENUM query. In other words, the limit processing unit 323 determines whether or not the ENUM query is a limit target.

For example, the limit processing unit 323 determines that an ENUM query is a limit target if the ENUM query exceeds the number of queries allowed per unit time, and determines that ENUM queries that include the call destination number are limit targets based on the limiting ratio.

In the case of determining that the ENUM query is not a limit target (step S13: No), the limit processing unit 323 outputs the ENUM query to the connection destination information search unit 324, and then the processing moves to step S14. On the other hand, in the case of determining that the ENUM query is a limit target, the limit processing unit 323 outputs the query to the signal response unit 325, and then the processing moves to step S16.

In step S14, the connection destination information search unit 324 receives the ENUM query and extracts the call destination information included in the query. The connection destination information search unit 324 then references the connection destination information DB 330 (see FIG. 4) in the storage unit 33 and searches for connection destination information that corresponds to the call destination information. The connection destination information search unit 324 extracts the connection destination information that was found in the connection destination information DB 330, and outputs a processing instruction to the signal response unit 325.

In the case of an ENUM query for which the connection destination information search unit 324 extracted connection destination information, the signal response unit 325 generates an ENUM answer that includes the extracted connection destination information and transmits the ENUM answer to the ENUM server 30 in the other network that transmitted the ENUM query (step S15), and then this processing is ended.

On the other hand, in the case of determining that the ENUM query is a limit target (step S13: Yes), the limit processing unit 323 generates an ENUM answer that indicates connection unavailability and transmits the ENUM answer to the ENUM server 30 in the other network (step S16), and then this processing is ended.

Accordingly, with the ENUM server 30 and the congestion control method according to the present embodiment, the ENUM server 30 monitors overall network traffic, and upon detecting that a call destination number (specific number) is in the congested state, the ENUM server 30 can suppress the number of connections from the other network (sender provider network) to the local network (receiver provider network) by performing limiting on ENUM queries that include the call destination number. Accordingly, in comparison with conventional technology, it is possible to reduce the number of SIP signals due to call limiting, and reduce the load on call processing apparatuses in the local network (receiver provider network).

REFERENCE SIGNS LIST

1 Terminal
2 SIP server
4 NNI-SBC
5 CSCF
6 AS
30 ENUM server
31 Input/output unit
32 Control unit
33 Storage unit (storage means)
321 Signal reception unit
322 Congestion detection unit
323 Limit processing unit
324 Connection destination information search unit
325 Signal response unit
330 Connection destination information DB
331 Calculated call amount information

The invention claimed is:

1. An ENUM server for receiving an ENUM query from another network that includes a sender terminal and transmitting, to the other network, connection destination information that corresponds to a call destination number of a receiver terminal that is indicated in the ENUM query and managed in a local network, the ENUM server comprising:

a signal reception unit, including one or more processors, configured to receive an ENUM query from the other network;

a congestion detection unit, including one or more processors, configured to collect traffic information regarding calls that include call destination numbers from call processing apparatuses in the local network, calculate a call amount per unit time for each call destination number, and store the call amounts per unit time as calculated call amount information in a storage unit, and also configured to extract a call destination number included in the received ENUM query, reference the calculated call amount information, and determine that calls to the extracted call destination number are in a congested state if the call amount regarding the extracted call destination number exceeds a predetermined threshold value;

a limit processing unit, including one or more processors, configured to, if it was determined that the call destination number included in the received ENUM query is in the congested state, determine whether or not the ENUM query is to be a limit target based on predetermined limit processing;

and a signal response unit, including one or more processors, configured to, if it was determined that the ENUM query is the limit target, generate an ENUM answer that indicates connection unavailability, set a Time To Live (TTL) value of the ENUM answer to 0, and transmit the ENUM answer to the other network.

2. A congestion control method performed in an ENUM server for receiving an ENUM query from another network that includes a sender terminal and transmitting, to the other network, connection destination information that corresponds to a call destination number of a receiver terminal that is indicated in the ENUM query and managed in a local network, the congestion control method causing the ENUM server to execute:

collecting traffic information regarding calls that include call destination numbers from call processing apparatuses in the local network, calculating a call amount per unit time for each call destination number, and storing the call amounts per unit time as calculated call amount information in a storage means;

receiving an ENUM query from the other network;

extracting a call destination number included in the received ENUM query, referencing the calculated call amount information, and determining that calls to the extracted call destination number are in a congested state if the call amount regarding the extracted call destination number exceeds a predetermined threshold value;

if it was determined that the call destination number included in the received ENUM query is in the congested state, determining whether or not the ENUM query is to be a limit target based on predetermined limit processing; and if it was determined that the ENUM query is the limit target, generating an ENUM answer that indicates connection unavailability, setting a Time To Live (TTL) value of the ENUM answer to 0, and transmitting the ENUM answer to the other network.

3. A non-transitory computer readable medium storing a congestion control program for enabling a computer serving as an ENUM server for receiving an ENUM query from another network that includes a sender terminal and transmitting, to the other network, connection destination information that corresponds to a call destination number of a receiver terminal that is indicated in the ENUM query and managed in a local network, the congestion control program causing the computer to execute:

collecting traffic information regarding calls that include call destination numbers from call processing apparatuses in the local network, calculating a call amount per unit time for each call destination number, and storing the call amounts per unit time as calculated call amount information in a storage means;

receiving an ENUM query from the other network;

extracting a call destination number included in the received ENUM query, referencing the calculated call amount information, and determining that calls to the extracted call destination number are in a congested state if the call amount regarding the extracted call destination number exceeds a predetermined threshold value;

if it was determined that the call destination number included in the received ENUM query is in the congested state, determining whether or not the ENUM query is to be a limit target based on predetermined limit processing; and if it was determined that the ENUM query is the limit target, generating an ENUM answer that indicates connection unavailability, setting a Time To Live (TTL) value of the ENUM answer to 0, and transmitting the ENUM answer to the other network.

* * * * *